Patented Oct. 25, 1949

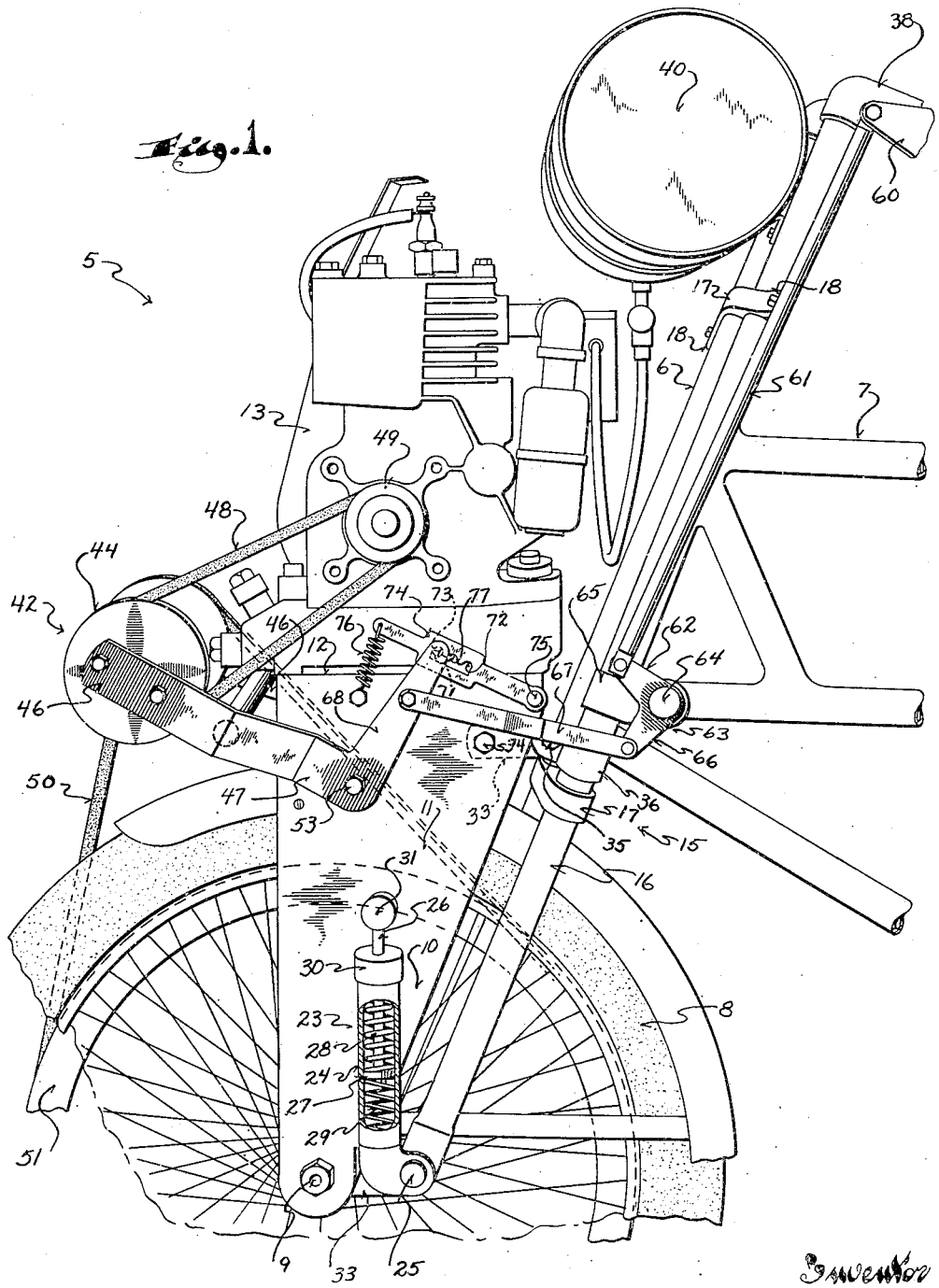

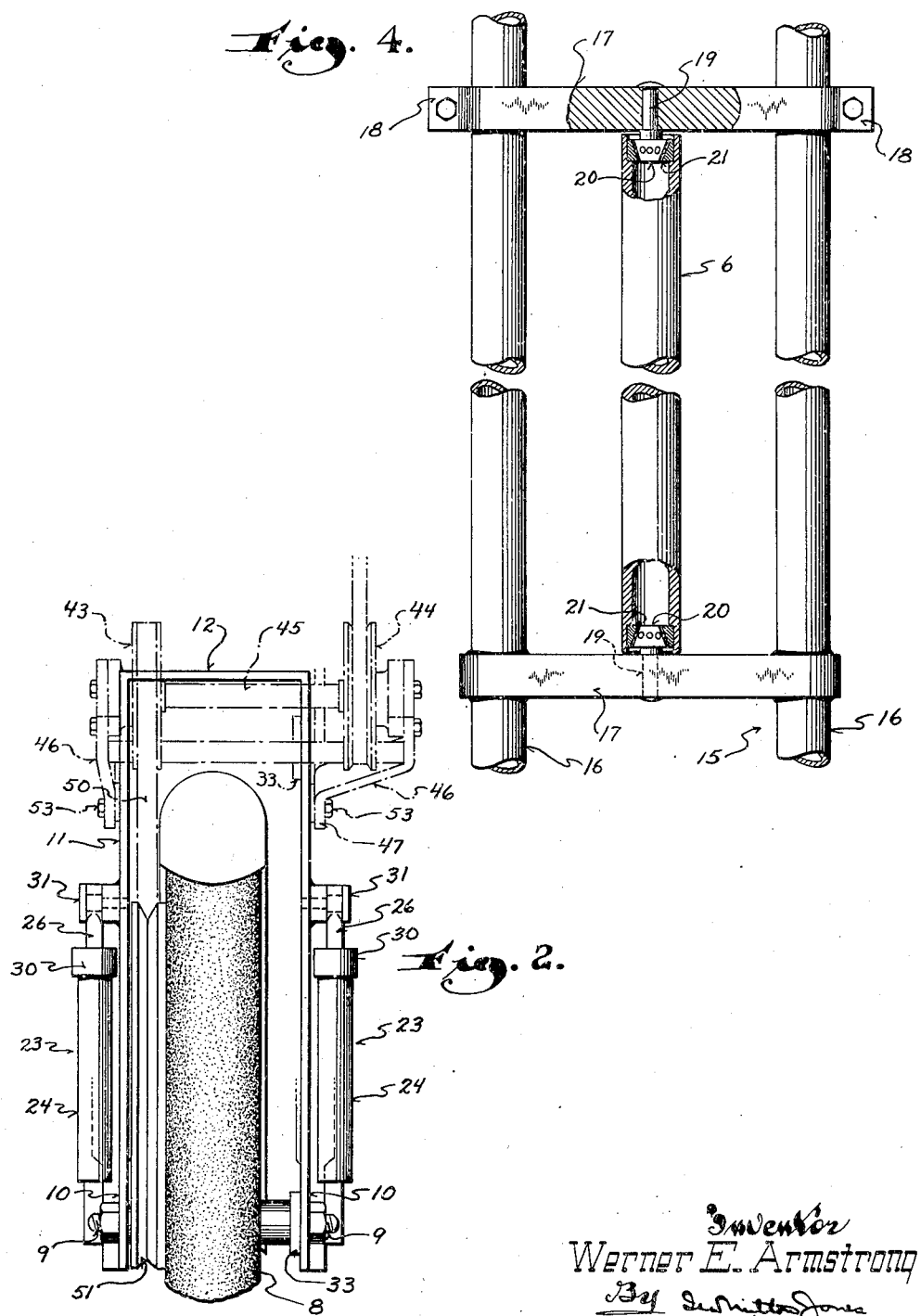

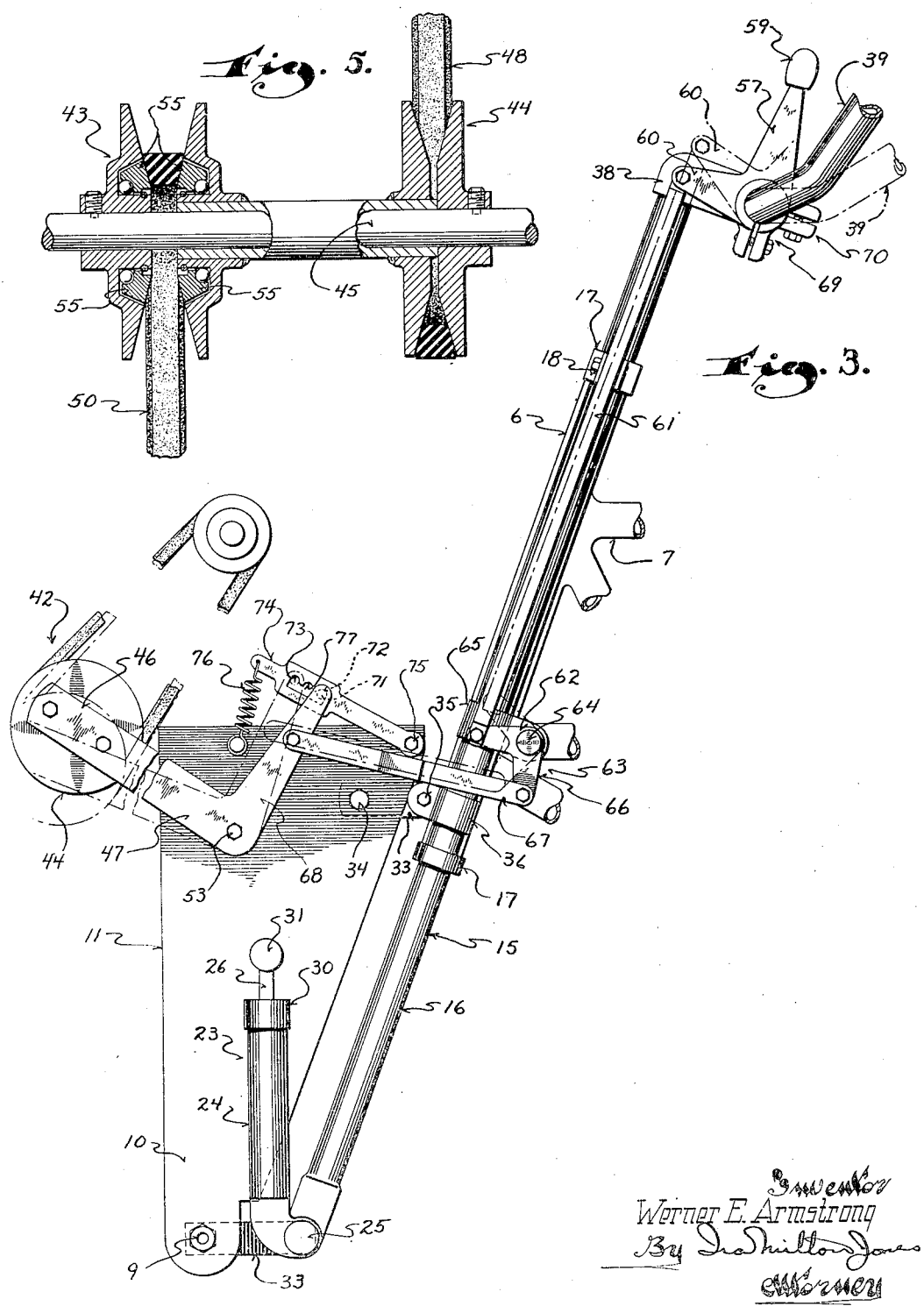

2,486,095

UNITED STATES PATENT OFFICE 2,486,095

POWER DRIVE ATTACHMENT FOR BICYCLES

Werner E. Armstrong, Milwaukee, Wis., assignor to Briggs & Stratton Corporation, Milwaukee, Wis., a corporation of Delaware Application March 30, 1946, Serial No. 658,538

7 Claims. (Cl. 180—33)

1

This invention relates to self propelled bicycles and has particular reference to a power drive attachment easily applied to ordinary bicycles to render the same self propelling.

There have been many attempts in the past to provide bicycles with power drives to render the same self propelling. For the most part bicycles of this type were specially constructed at the factory and in most instances had the power drive mechanism on or over the rear wheel of the bicycle.

In as much as the saddle of the bicycle is also located close to the rear wheel it follows that the weight of the rider as well as the weight of the power drive mechanism was substantially concentrated on the rear or power wheel of the bicycle in these past constructions. The result of such localization of the weight at the rear wheel of the bicycle was to render lateral stability of the bicycle extremely poor except during travel of the vehicle at fair rates of speed. Stability at lower or starting speeds was attained only by much turning of the steering mechanism in an effort to retain proper balance.

With this objection to past power driven bicycles in mind, it is one of the principal objects of this invention to provide a power driven bicycle wherein the drive mechanism is located in front of the bicycle frame and over the front wheel of the bicycle so that its weight and the weight of the rider are substantially distributed over both wheels of the vehicle for improved lateral stability thereof.

Another object of this invention resides in the provision of a power drive attachment for bicycles which is provided with a drive wheel adapted to be substituted for the front wheel of the bicycle during the application of the attachment thereto and wherein the engine and transmission mechanism is mounted directly over the drive wheel so as to be positioned forwardly of the bicycle frame.

In this connection it is a further object of this invention to provide a power drive attachment of the character described wherein the attachment is adapted for connection to the front frame structure of the bicycle in a manner freeing the same from the weight of the engine and drive mechanism so that the drive mechanism is carried entirely by the front drive wheel of the bicycle.

Still another object of this invention resides in the provision of a power drive attachment of the character described having a fork structure forming a part thereof and adapted to take the place of the bicycle fork to thereby provide for connection of the attachment to the bicycle.

A further object of this invention resides in the provision of a unitary power drive attachment for bicycles having a simple and efficient transmission unit with controls therefor carried jointly by the fork structure of the attachment and the engine support.

Another object of this invention resides in the provision of a power drive attachment of the character described incorporating a novel connection between the fork forming structure and the drive wheel thereof by which the front of the bicycle frame is yieldingly suspended from the drive wheel and the drive wheel and power drive mechanism supported thereby is capable of independent motion in an up and down direction to prevent transmission of vibration and shocks to the bicycle frame.

With the above and other objects in view which will appear as the description proceeds, this invention resides in the novel construction, combination and arrangement of parts substantially as hereinafter described, and more particularly defined by the appended claims, it being understood that such changes in the precise embodiment of the herein disclosed invention may be made as come within the scope of the claims.

The accompanying drawings illustrate one complete example of the physical embodiment of the invention constructed in accordance with the best mode so far devised for the practical application of the principles thereof, and in which:

Figure 1 is an elevational view showing a portion of the front of a bicycle and illustrating the attachment of this invention in place thereon;

Figure 2 is a front view of the bicycle with the engine and transmission unit removed;

Figure 3 is a side elevational view of a portion of the attachment with the transmission unit shifted to neutral;

Figure 4 is an elevational view of a portion of the fork structure of the attachment illustrating the manner of connecting the attachment to the front frame member of a bicycle; and Figure 5 is a detail view partly in section and partly in elevation illustrating the V-pulley transmission unit for the attachment.

Referring now more particularly to the accompanying drawings in which like numerals indicate like parts throughout the several views, the numeral 5 generally designates the power drive attachment of this invention which is adapted to be attached to the substantially upright member 6 at the front of the bicycle frame 7 so as to be positioned at the front of the bicycle.

The attachment comprises a drive wheel 8 rotatably journalled as at 9 from the arms 10 of a substantially U-shaped supporting bracket 11 with the arms 10 embracing the drive wheel as clearly shown in Figure 2. The portion of the bracket joining its opposite side arms thus provides a substantially horizontal supporting platform 12 upon which a small internal combustion engine 13 is mounted.

With the attachment in place at the front of the bicycle, it will be noted that the engine is positioned directly above the drive wheel to be wholly supported thereby.

The attachment is also provided with a front fork structure 15 consisting of a pair of tubular elements 16 rigidly connected together in spaced side by side relationship by means of cross ties 17. The uppermost cross tie 17 is preferably secured to the fork forming elements 16 by means of clamps 18 which enable its adjustment longitudinally of the fork structure.

The cross ties 17 provide the means by which the attachment may be secured to the bicycle with the fork structure 15 taking the place of the front fork with which the bicycle is supplied, and the drive wheel 8 taking the place of the front wheel of the bicycle.

For this purpose the tie members each carry stub shafts 19 projecting toward each other on a common axis substantially parallel to the axes of the fork forming members 16 and located medially therebetween. These stub shafts have the inner races 20 of cone bearings fixed thereon and are projectible into the opposite ends of the substantially upright tubular frame member 6 of the bicycle for cooperation with the outer races of the cone bearings 21 therein.

It will be apparent, therefore, that connection of the attachment to the bicycle merely entails removal of the front wheel and fork of the bicycle together with the handlebars thereof and the insertion of the lowermost bearing 20 into the bottom end of the frame member 6 while the upper tie member 17 is held in an elevated position. Thereafter the upper tie member 17 is lowered along the fork forming elements 16 to bring its bearing 20 inside the upper end of the front frame member 6 for cooperation with the outer race 21 therein and securely tightened by means of the clamps 18 to hold the same in position on the fork structure.

The fork structure 15 is thus free to turn or rock on a substantially upright axis, and extends downwardly alongside the rear edges of the arms 10 of the mounting bracket 11 to points adjacent to the wheel axis 9. A pair of spring suspension devices 23 overlying the arms 10 of the U-shaped supporting bracket 11 and reacting between the bracket and the lower extremities of the fork forming elements 16 provide for yieldingly suspending the front of the bicycle from the drive wheel 8.

Each of the spring suspension devices includes a cylinder 24 the closed lower end of which is pivotally connected as at 25 with the lower extremity of the adjacent fork forming element 16. Rods 26 project down into each cylinder, and a washer 27 fixed on each rod inside the cylinder provides a spring seat for a pair of coil compression springs 28 and 29 at opposite sides of the washer.

The spring 29 is lighter than the spring 28 and is confined between the bottom of the cylinder and the underside of the washer. The spring 28 is confined between a cap 30 secured over the upper open end of each of the cylinders and the top side of the washer facing the cap.

The rods 26 project upwardly through suitable holes in each of the caps and studs 31 carried by the opposite arms 10 of the supporting bracket and passing through the ends of the rods mount the same for rocking motion on a common transverse axis substantially parallel to the drive wheel axis.

Thus, it will be noted that the comparatively heavy coil spring 28 yieldingly bears the weight of the front of the bicycle and that both springs 28 and 29 cooperate to yieldingly resist up and down motion of the supporting bracket 11 relative to the fork structure.

The fork structure 15 is also connected with the supporting bracket 11 by means of pairs of parallel links 33. The lower links 33 connect between the pivot axes 25 of the spring suspension devices and the drive wheel axle. The upper pair of links are pivotally connected to their adjacent side arms 10 by means of studs 34 passing through the side arms a short distance beneath the horizontal platform 12, and their opposite ends projecting rearwardly of the bracket in parallel relationship with the lower links are pivotally connected as at 35 to clamps 36 secured on each of the fork forming elements 16.

The links 33 connect the supporting bracket and drive wheel with the fork structure 15 so that the drive wheel turns with the fork structure when the same is rocked upon its substantially upright axis to enable steering of the vehicle, and also act to guide the bracket for substantially up and down motion relative to the fork structure. Such motion is, of course, yieldingly resisted by the springs of the spring suspension devices 23.

The fork forming elements 16 project a substantial distance upwardly from the top of the upright frame member 6 and each has an arm 38 fixed thereon extending rearwardly from the fork structure and cooperating to mount a handlebar 39 therefrom by which the drive wheel is turned for steering. The upward extension of the fork forming elements 16 also provide a convenient mounting for a gasoline tank 40 for the engine.

The drive wheel of the attachment is driven from the engine through a transmission unit 42 of the V-pulley type embodying a clutch pulley shown at 43 in Figure 5. The transmission unit here shown forms the subject matter of applicant's copending application, Serial No. 653,061, filed March 8, 1946, now abandoned, and will be only briefly described herein.

It will be sufficient for the purposes of this description, therefore, to note that the pulleys 43 and 44 of the transmission unit are mounted on a common shaft 45 extending between the opposite arms 46 of a yoke 47 having bearings (not shown) for freely rotatably supporting the shaft. Each of the pulleys 43 and 44 is comprised of cooperating cone flanges, the outermost flanges being fixed on the shaft and the inner flanges being connected together by a common hub and slidable axially in unison along the shaft to vary the effective diameters of the pulleys.

One of the belts 48 connects the pulley 44 with a pulley 49 on the engine shaft and a similar belt 50 connects the clutch pulley 43 with a large drive pulley 51 carried by the drive wheel 8 at one side thereof. Hence, tightening of the belt about one of the pulleys effects axial sliding motion of the inner pulley flanges in one direction to decrease the effective diameter of said pulley and simultaneously increase the effective diameter of the other pulley.

In the present instance the transmission unit has its yoke 47 embracing and pivotally connected as at 53 with the opposite arms 10 of the supporting bracket so that the yoke may swing about a substantially horizontal axis parallel to the drive wheel axis and substantially on a line between the engine shaft axis and that of the drive wheel.

Inasmuch as the yoke projects forwardly from its pivot axis, bodily swinging motion of the pulley unit toward the drive wheel and away from the engine shaft tightens the belt about the pulley 44 to decrease its effective diameter and simultaneously increase the effective diameter of the clutch pulley 43 to establish a high speed driving connection between the engine and drive wheel.

Bodily swinging of the transmission in the opposite direction toward the engine shaft and away from the drive wheel tightens the belt 50 about the clutch pulley 43 to decrease its effective diameter and simultaneously increase the effective diameter of the cooperating pulley 44 to establish a low speed driving connection between the engine and drive wheel.

If swung toward the engine shaft to an extreme position to further tighten the belt 50 about the clutch pulley 43, the belt 50 rides down off the cooperating cone faces on the flanges of the pulley and onto freely rotatable bearing elements 55 carried by the pulley flanges to effect declutching of the transmission. The engine is thus enabled to run without driving the wheel 8.

The transmission unit may be bodily swung to different positions producing different driving speeds or declutching of the transmission by means of an actuator 57 pivotally carried by the handlebar 39 adjacent to one of the fork forming elements 16. The actuator is in the form of a bell crank lever having a handle portion 59 and a forwardly extending limb 60 connected by means of a link 61 extending alongside said fork forming element to one of the arms 62 of another bell crank lever 63.

The lever 63 is pivotally supported from a stud 64 carried by a clamp 65 fixed on said adjacent fork forming element. The bell crank lever 63 has a downwardly depending arm 66 which is connected through another link 67 with an upstanding arm 68 on the yoke 47 so that pivoting of the actuator 57 on its axis in one direction or the other is translated into bodily swinging motion of the transmission unit in opposite directions.

It is to be appreciated that the actuator 57 may, if desired, be fixed on the transverse portion of the handlebar as by a clamp arrangement 69 on the actuator so that a slight tilting motion of the handlebar itself about its clamp connection 70 to the arms 38 effects the desired bodily swinging motion of the transmission unit. In this latter instance, it will be understood that the connection 70 between the handlebar and the arms 38 is adjusted to embody a degree of friction by which free pivoting of the handlebar on its horizontal axis is resisted; and that if the actuator 57 is loose on the handlebar, the handlebar may be rigidly held by its connection with the arms 38.

In the position of the transmission illustrated in Figure 1 the drive wheel 8 is connected with the engine for high speed operation of the vehicle while in the position illustrated in Figure 3 the transmission is in neutral. These positions are defined by engagement of a pin 71 on the outer extremity of the yoke arm 68 in either one of a pair of notches 72 or 73 formed in a latch 74. The latch is freely pivotally supported from the supporting bracket as at 75 and projects forwardly to have its free end disposed nearly over the pivot axis 53 for the transmission unit.

A tension spring 76 anchored to the supporting bracket at one end and having its opposite end connected with the outer end of the latch 74 yieldingly holds the pin 71 on the arm 68 engaged in either of the notches 72 or 73 with a detent action. The latch is also provided with a third notch 77 positioned between the notches 72 and 73 to define a low speed position for the transmission.

It is the function of the latch to releasably hold the transmission unit in any one of its three defined positions during operation of the vehicle but to readily permit speeds to be changed either by actuation of the handlebar or the actuator as previously described. Thus, it will be noted that the transmission unit and controls therefor are carried jointly by the mounting bracket 11 and the fork structure 15 so as to be a part of the attachment.

The attachment illustrated is particularly well suited for use with bicycles of the so-called delivery type having a small diameter front wheel, but it will be apparent that the attachment is equally as well suited for use with conventional type bicycles.

From the foregoing description taken in connection with the accompanying drawings, it will be readily apparent to those skilled in the art that the power drive attachment of this invention is not only desirably simple and easy to apply to any bicycle, but that the position of the attachment in front of the bicycle greatly increases lateral stability thereof.

What I claim as my invention is:

1. A power drive attachment for bicycles having a substantially upright frame member at the front thereof, comprising: a drive wheel to take the place of the front wheel of the bicycle; a substantially U-shaped supporting bracket having opposite side arms embracing and rotatably journalling the drive wheel, the closed end of the bracket providing a substantially flat horizontal platform over the drive wheel; an engine rigidly mounted on said platform to have its entire weight borne by the drive wheel; variable speed transmission mechanism carried by said bracket for drivingly connecting the engine with the drive wheel; a pair of elongated fork forming elements rigidly connected together in spaced apart side by side relationship; means connecting the bracket with said fork forming elements for motion of the bracket relative thereto in a direction lengthwise of the fork forming elements; spring means reacting between the bracket and said fork forming elements for yieldingly resisting such relative motion therebetween; attaching means on said fork forming elements providing for pivotally connecting the same to said upright frame member of the bicycle with said elements at laterally opposite sides of said bicycle frame member to rock about an axis substantially defined by the upright frame member, said fork forming elements being substantially longer than said frame member; a handlebar connected with said fork forming elements for turning the drive wheel therethrough; and transmission control means carried jointly by the bracket and said fork forming elements and having an actuator positioned adjacent to the top of the fork forming elements.

2. A power drive attachment for bicycles of the type equipped with an upright frame member, comprising: a drive wheel to take the place of the front wheel of the bicycle to which the attachment is to be applied; a U-shaped fork-like supporting bracket providing a flat platform over the drive wheel; means rotatably journalling the drive wheel from said bracket between the arms thereof; a fork structure adapted to be substituted for the front fork of the bicycle and having means thereon providing for connecting the same with the front frame member of the bicycle so that the fork structure may pivot on a substantially upright axis; spring suspension devices connected between the fork structure and said supporting bracket and through which the front of the bicycle is yieldingly suspended from the drive wheel of the attachment; vertically spaced links connecting the supporting bracket with said fork structure and through which pivotal motion of the fork structure effects turning of the drive wheel for steering, said links permitting movement of the supporting bracket relative to the fork structure in a substantially up and down direction with such movement yieldingly resisted by said spring suspension devices; an engine mounted on said platform of the supporting bracket independently of the fork structure so as to receive support solely from the drive wheel; and variable speed transmission mechanism supported from said fork-like bracket and by which the drive wheel may be connected with and disconnected from the power shaft of the engine.

3. A power drive attachment for bicycles of the type having a substantially upright front frame element, comprising: a drive wheel to take the place of the front wheel of the bicycle; a substantially U-shaped supporting bracket having opposite side arms embracing the drive wheel and cooperating to rotatably journal the same with the drive wheel therebetween, the closed end of the bracket joining said arms providing a substantially horizontal platform over the drive wheel; an engine rigidly mounted on said platform so as to be supported entirely by the drive wheel; a variable speed V-pulley transmission unit of the type embodying a clutch pulley; means mounting said transmission unit on the supporting bracket for bodily swinging motion about an axis parallel to the drive wheel axis; belts connecting the pulleys of the transmission unit with the engine shaft and drive wheel; means carried by the attachment for bodily shifting said transmission unit in one direction to effect declutching of the transmission and for bodily swinging said transmission unit in the opposite direction to effect establishment of the drive between the engine and drive wheel with a speed ratio proportional to the extent of motion of the transmission unit in said opposite direction; and detent means carried by said bracket engaging a part movable with the transmission unit for releasably maintaining the transmission unit in any one of a plurality of different positions of adjustment including the declutched position of the transmission unit.

4. A power drive attachment for bicycles having a frame structure including a rigid substantially upright member at the front of the bicycle, comprising: a fork structure to take the place of the front fork of the bicycle to which the attachment is to be applied and adapted to be supported from said upright frame member of the bicycle for pivotal motion on a substantially upright axis; a drive wheel to take the place of the front wheel of the bicycle; a fork-like supporting bracket having opposite side arms embracing and rotatably journalling the drive wheel, the closed end of said bracket providing a relatively flat platform over the drive wheel; a connection between the fork structure and said supporting bracket through which the front frame structure of the bicycle is adapted to be supported from the drive wheel with said fork-like supporting bracket positioned ahead of the fork structure and constrained to turn in unison therewith; an engine rigidly mounted on said platform ahead of the fork structure and entirely independently of the fork structure; a variable speed V-pulley transmission unit of the type embodying a clutch pulley carried by said bracket for bodily swinging motion about an axis parallel to the drive wheel axis; belts connecting the pulleys of the transmission unit with the engine shaft and drive wheel; and detent means carried by the bracket for releasably holding the transmission unit in a plurality of different positions of adjustment on its pivotal mounting and defining the declutched position of the transmission unit and at least one speed ratio of the drive between the engine and drive wheel.

5. A power drive attachment for bicycles comprising: a fork-like supporting bracket connectable with the front frame structure of a bicycle; a drive wheel rotatably journalled between the opposite arms of the fork-like bracket; an engine rigidly mounted on the closed end of said bracket over the drive wheel; a V pulley transmission unit mounted on said supporting bracket for bodily swinging motion about an axis parallel to the drive wheel axis and through which the drive wheel is driven from the engine with a speed ratio therebetween depending upon the position to which said transmission unit is swung; a lever connected with said transmission unit and by which the same may be bodily swung in opposite directions about its pivotal mounting; manually operable transmission control means on the attachment including a movable actuator, and operating connections between said actuator and the lever for translating manually imparted motion of the actuator into bodily swinging motion of the transmission unit to thereby vary the speed ratio of the drive between the engine and the drive wheel; and detent means carried by said bracket and engageable with a part movable with the transmission unit in any one of a plurality of different positions of adjustment of the unit to define different speeds at which the drive wheel is driven.

6. A power drive attachment for bicycles having a substantially upright frame member at the front thereof, comprising: a drive wheel to take the place of the front wheel of the bicycle; a U-shaped bracket having its opposite side arms embracing and journaling the drive wheel for rotation on an axis fixed with respect to the bracket; an engine rigidly mounted on said bracket over the drive wheel to have its entire weight borne thereby and to have its crankshaft axis fixed with respect to the wheel axis; belt transmission means connecting the engine with the drive wheel; a fork structure connected with said upright frame member for rocking motion of the fork structure about a substantially upright axis; links connecting said bracket with said fork structure and allowing the bracket to move with respect to the fork structure; and means connected with said fork structure and said bracket for yieldingly resisting such movement of the bracket.

7. A power drive attachment for bicycles of the type having a substantially upright member at the front of the frame and an upright fork structure pivotally mounted on said member for steering movement, said power drive attachment comprising: a drive wheel having a driven transmission element fixed thereon; a substantially U-shaped bracket having opposite side arms embracing the drive wheel and cooperating to rotatably journal the drive wheel on an axis fixed with respect to said bracket, the closed end of the bracket providing a relatively flat platform over the drive wheel; an engine rigidly mounted on said bracket to have its crankshaft axis fixed with respect to the drive wheel axis; transmission means connecting the crankshaft of the engine with the driven transmission element on the drive wheel; means supporting said bracket from the fork in a manner constraining the bracket to steering movement with the fork but permitting the bracket to move up and down with respect to the fork; and means connected with the bracket and the fork for yieldingly resisting such up and down movement.

WERNER E. ARMSTRONG.

REFERENCES CITED

The following references are of record in the file of this patent:

UNITED STATES PATENTS

| Number | Name | Date |
|---|---|---|
| 860,251 | Schmoele | July 16, 1907 |
| 1,179,138 | Pascal | Apr. 11, 1916 |
| 1,203,927 | Stagni | Nov. 7, 1916 |
| 1,212,982 | Mauclaire | Jan. 16, 1917 |
| 1,217,602 | Jern | Feb. 27, 1917 |
| 1,377,948 | Wacker | May 10, 1921 |
| 1,485,935 | MacLean | Mar. 4, 1924 |
| 1,692,593 | Szabo | Nov. 20, 1928 |
| 1,780,034 | Osborn et al. | Oct. 28, 1930 |

FOREIGN PATENTS

| Number | Country | Date |
|---|---|---|
| 23,575 | Great Britain | Nov. 21, 1901 |
| 108,357 | Germany | Feb. 8, 1900 |